US010466471B2

United States Patent
Zhou et al.

(10) Patent No.: US 10,466,471 B2
(45) Date of Patent: Nov. 5, 2019

(54) THREE-LAYER FULL-COLOR DYNAMIC ELECTRONIC PAPER

(71) Applicants: SHENZHEN GUOHUA OPTOELECTRONICS CO., LTD., Guangdong Province (CN); ACADEMY OF SHENZHEN GUOHUA OPTOELECTRONICS, Guangdong Province (CN); SOUTH CHINA NORMAL UNIVERSITY, Guandong Province (CN)

(72) Inventors: Guofu Zhou, Guangdong Province (CN); Fangchao Tian, Guangdong Providence (CN); Zhijie Luo, Guangdong Province (CN); Weinan Zhang, Guangdong Province (CN)

(73) Assignees: Shenzhen Guohua Optoelectronics Co., Ltd., Shenzhen, Guangdong (CN); Academy of Shenzhen Guohua Optoelectronics, Shenzhen, Guangdong (CN); South China Normal University, Guangzhou, Guangdong (CN)

( * ) Notice: Subject to any disclaimer, the term of this patent is extended or adjusted under 35 U.S.C. 154(b) by 0 days.

(21) Appl. No.: 15/754,158

(22) PCT Filed: Jan. 7, 2016

(86) PCT No.: PCT/CN2016/070366
§ 371 (c)(1),
(2) Date: Feb. 21, 2018

(87) PCT Pub. No.: WO2017/031927
PCT Pub. Date: Mar. 2, 2017

(65) Prior Publication Data
US 2018/0246316 A1    Aug. 30, 2018

(30) Foreign Application Priority Data

Aug. 21, 2015 (CN) .......................... 2015 1 0520261

(51) Int. Cl.
G02B 26/00 (2006.01)
(52) U.S. Cl.
CPC .......... G02B 26/005 (2013.01); G02B 26/00 (2013.01)
(58) Field of Classification Search
CPC ........................... G02B 26/005; G02B 26/00
(Continued)

(56) References Cited

U.S. PATENT DOCUMENTS 7,586,472 B2 *  9/2009  Marcu .................. G02B 26/005
                                                 345/32
8,203,512 B2 *  6/2012  Marcu .................. G02B 26/005
                                                 345/32
(Continued)

FOREIGN PATENT DOCUMENTS

CN  104834084 A  *  8/2015  ............. G02B 26/00
CN  105044904 A  *  11/2015  ............. G02B 26/00

OTHER PUBLICATIONS

Translation of CN-105044904-A into English from https://patentscope.wipo.int, performed Mar. 13, 2019.*
(Continued)

Primary Examiner — Frank G Font
(74) Attorney, Agent, or Firm — Douglas C. Tsao; Williams Mullen (57) ABSTRACT

Three-layer full-color dynamic electronic paper, comprising a substrate, a controller, a first EWOD display layer, a second EWOD display layer and a third EWOD display layer, wherein each of the first, second and third EWOD display layer is comprised of an upper transparent electrode plate, a hydrophobic insulating layer, pixel walls, colored
(Continued)

ink, colorless liquid, a lower transparent electrode plate, an encapsulation adhesive, and a driving chip connected to the upper transparent electrode plate and the lower transparent electrode plate respectively; the lower transparent electrode plate of the third EWOD display layer is located above the substrate; the colored ink filled in the first, second and third EWOD display layer is cyan ink, magenta ink and yellow ink, respectively; and, the controller controls voltage waveforms of the three driving chips according to a subtractive color mixture principle of three primary colors for printing, so as to realize full-color displaying.

19 Claims, 6 Drawing Sheets (58) Field of Classification Search
USPC .................................. 359/226.3, 228, 886
See application file for complete search history.

(56) References Cited

U.S. PATENT DOCUMENTS

| | | | | |
|---|---|---|---|---|
| 8,760,746 | B2* | 6/2014 | Tian | G02B 26/005 359/228 |
| 2007/0019006 | A1* | 1/2007 | Marcu | G02B 26/005 345/690 |
| 2010/0090930 | A1* | 4/2010 | Marcu | G02B 26/005 345/72 |
| 2011/0140996 | A1* | 6/2011 | Parry-Jones | G02B 26/005 345/60 |
| 2012/0154886 | A1* | 6/2012 | Heikenfeld | G02B 26/004 359/228 |
| 2012/0307330 | A1* | 12/2012 | Tian | G02B 26/005 359/228 |
| 2013/0215491 | A1* | 8/2013 | Choi | G02B 26/005 359/290 |
| 2014/0078154 | A1* | 3/2014 | Payne | G02B 26/02 345/501 |
| 2014/0240652 | A1* | 8/2014 | Satoh | G09F 9/35 349/165 |
| 2015/0226956 | A1* | 8/2015 | Bergeron | G02B 26/005 345/63 |
| 2015/0370141 | A1* | 12/2015 | Guo | G02F 1/167 359/296 |
| 2017/0003496 | A1* | 1/2017 | De Greef | G02B 26/005 |

OTHER PUBLICATIONS

Translation of CN-104834084-A into English from https://patentscope.wipo.int, performed Mar. 13, 2019.*

* cited by examiner (--Prior Art--)

THREE-LAYER FULL-COLOR DYNAMIC ELECTRONIC PAPER

CROSS REFERENCE TO RELATED APPLICATIONS

This application is a 371 National Stage of International Application No. PCT/CN2016/070366, filed Jan. 7, 2016, now Publication No. WO 2017/031927, published Mar. 2, 2017, which claims priority benefit of Chinese Application No. 201510520261.0, filed Aug. 21, 2015, each of which is hereby incorporated by reference into this application.

TECHNICAL FIELD

The present disclosure relates to the field of electronic paper and in particular to three-layer full-color dynamic electronic paper.

BACKGROUND

The EWOD (Electrowetting on Dielectric) display technology is a novel paper display technology that combines the advantages of the ordinary paper and the electronic display technology. The EWOD display technology can realize dynamic display since it is rapid in response time. Compared with active light-emitting panels (e.g., LCDs and AMOLEDs), EWOD display panels do not need any backlight module, so that the EWOD display technology has the characteristic of low power consumption. As one of reflective display technologies, the EWOD display panels only need ambient light for displaying purpose, so the EWOD display panels also have the advantages of high brightness, high contrast and wide angle of view.

Figure 1:
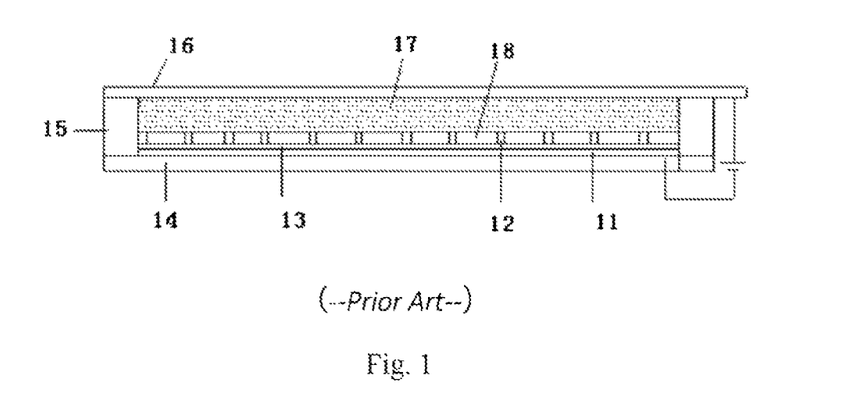
FIG. 1 is a structural diagram of an existing single-layer EWOD display device.

In 2003, on *Nature*, Robert A. Hayes and B. J. Feenstra from Philips firstly proposed the application prospect of EWOD in the display field and provided a prototype design for display devices based on the EWOD technology. FIG. 1 shows the structure of a single-layer EWOD display device commonly used in the art at present. The single-layer EWOD display device consists of a transparent glass or plastic substrate 14, a transparent conducting layer 13, a hydrophobic insulating layer 18, pixel walls 12, a bottom electrode 11, colored ink, colorless liquid 17 (water or ionic liquid), an upper transparent electrode plate 16 coated with a conducting layer, and an encapsulation adhesive 15. When the electro-wetting display device is powered off, nonpolar ink is spread flat on and cover the hydrophobic insulating layer 18, so that the display displays the color of the ink; when a voltage is applied, the original interface balance is changed by an electrostatic force, and the water 17 pushes the ink to a corner, so that light penetrates through the hydrophobic insulating layer 18 and is then reflected by the substrate in white 14, and a white color is displayed. However, since the existing single-layer EWOD electronic paper display device is of a single-layer ink-filled structure and the hydrophobic insulating layer 18 is filled with only one colored ink, only one color (i.e., the color of the filled ink) can be displayed when an electric field is applied. It's hard for the existing single-layer EWOD electronic paper display device to realize full-color displaying, thus it's not comprehensive enough, and the range of applications is small.

SUMMARY

To solve the above technical problems, an objective of the present disclosure is to provide three-layer full-color dynamic electronic paper which is comprehensive and has a wide range of application.

To solve the technical problem, the present disclosure employs the following technical solutions.

Three-layer full-color dynamic electronic paper is provided, including a substrate, a controller, and a first EWOD display layer, a second EWOD display layer and a third EWOD display layer which are vertically distributed from top to bottom, wherein each of the first EWOD display layer, the second EWOD display layer and the third EWOD display layer is comprised of an upper transparent electrode plate, a hydrophobic insulating layer, pixel walls, colored ink, colorless liquid, a lower transparent electrode plate, an encapsulation adhesive and a driving chip, with the driving chip connected to the upper transparent electrode plate and the lower transparent electrode plate, respectively; the lower transparent electrode plate of the third EWOD display layer is located above the substrate; the colored ink filled in the hydrophobic insulating layers of the first EWOD display layer, the second EWOD display layer and the third EWOD display layer is cyan ink, magenta ink and yellow ink, respectively; and, the controller controls voltage waveforms of the three driving chips according to a subtractive color mixture principle of three primary colors for printing, so as to realize the overlay of different colors in a vertical structure and the full-color displaying of the electronic paper.

Further, when the voltage (also it may be a voltage difference between different voltages applied to different electrodes) applied between the upper transparent electrode plate and the lower transparent electrode plate by the driving chip is greater than or equal to a set voltage threshold, the colored ink will shrink to one side of the hydrophobic insulating layer, so that light can penetrate through the hydrophobic insulating layer; and conversely, when the voltage applied between the upper transparent electrode plate and the lower transparent electrode plate by the driving chip is less than the set voltage threshold, the colored ink is spread flat on the hydrophobic insulating layer, so that light cannot penetrate through the hydrophobic insulating layer.

Further, the controller is an STM 32 microcontroller, and the three driving chips are SSD1623 bistable display drivers.

Further, each of the first EWOD display layer, the second EWOD display layer and the third EWOD display layer is comprised of 64 pixel segments, and each of the pixel segments is comprised of a plurality of pixels separated by the pixel walls, wherein lower electrodes of all pixels in the same pixel segment are connected to form a pixel segment electrode, and the 64 pixel segment electrodes constitute lower transparent electrodes; upper electrodes of all pixels in the same pixel segment are connected to form a common electrode, and the common electrodes of the 64 pixel segments are connected to form a master common electrode as the upper transparent electrode plate; and, the 64 pixel segment electrodes and the one master common electrode are connected to 65 pins of the driving chip, respectively.

Further, the substrate is a substrate in white.

Further, under the premise that a low-voltage voltage is applied to the three upper transparent electrode plates, if a high-voltage waveform is applied to the pixel segment electrodes of all the first EWOD display layer, the second EWOD display layer and the third EWOD display layer, the color displayed by the electronic paper is the white color of the substrate; if a low-voltage waveform is applied to the pixel segment electrodes of all the first EWOD display layer, the second EWOD display layer and the third EWOD display layer, the color displayed by the electronic paper is black color; if a high-voltage waveform is applied to the pixel segment electrodes of the first EWOD display layer and the second EWOD display layer while a low-voltage waveform is applied to the pixel segment electrodes of the third EWOD display layer, the color displayed by the electronic paper is yellow color; if a high-voltage waveform is applied to the pixel segment electrodes of the second EWOD display layer and the third EWOD display layer while a low-voltage waveform is applied to the pixel segment electrodes of the first EWOD display layer, the color displayed by the electronic paper is cyan color; if a high-voltage waveform is applied to the pixel segment electrodes of the first EWOD display layer and the third EWOD display layer while a low-voltage waveform is applied to the pixel segment electrodes of the second EWOD display layer, the color displayed by the electronic paper is magenta color; if a low-voltage waveform is applied to the pixel segment electrodes of the first EWOD display layer and the second EWOD display layer while a high-voltage waveform is applied to the pixel segment electrodes of the third EWOD display layer, the color displayed by the electronic paper is blue color; if a low-voltage waveform is applied to the pixel segment electrodes of the first EWOD display layer and the third EWOD display layer while a high-voltage waveform is applied to the pixel segment electrodes of the second EWOD display layer, the color displayed by the electronic paper is green color; and, if a low-voltage waveform is applied to the pixel segment electrodes of the second EWOD display layer and the third EWOD display layer while a high-voltage waveform is applied to the pixel segment electrodes of the first EWOD display layer, the color displayed by the electronic paper is red color.

Further, the controller is connected to the driving chips via SPI buses, and the driving chips are connected to the upper transparent electrode plates and the lower transparent electrode plates via FPC flat cables, respectively.

Further, the three-layer full-color dynamic electronic paper further includes a touch key, an output terminal of which is connected to an input terminal of the controller.

Further, indium tin oxide conductive layers are coated on both the upper transparent electrode plates and the lower transparent electrode plates.

Further, the colorless liquid is water.

The present disclosure has the following beneficial technical effects. The three-layer full-color dynamic electronic paper includes a first EWOD display layer, a second EWOD display layer and a third EWOD display layer which are vertically distributed from top to bottom, and is formed by vertically superposing three EWOD structures which are respectively filled with cyan ink, magenta ink and yellow ink. Therefore, based on the conventional single-layer EWOD display device, two additional EWOD display layers are superposed, and the driving waveform of the driving chip corresponding to each color is controlled by the controller according to the subtractive color mixture principle of three primary colors for printing, so that the full-color displaying is realized. Besides, it is more comprehensive, and the range of application is wider. Furthermore, by using general CMOS display driving controllers SSD1623 as the driving chips, up to 96 pixel segments can be driven separately and the driving voltage is adjustable, so that each pixel segment in the three-layer EWOD display screen structure can be controlled. Accordingly, it is more flexible and convenient.

BRIEF DESCRIPTION OF THE DRAWINGS

The present disclosure will be further described below by embodiments with reference to the accompanying drawings.

in which: 11: bottom electrode; 13: transparent conducting layer; 14: substrate; 15 and 21: encapsulation adhesive; 12 and 22: pixel wall; 18, 23, 26 and 27: hydrophobic insulating layer; 24: lower transparent electrode plate; 16 and 25: upper transparent electrode plate; 17 and 28: colorless liquid; and, 3: pixel segment electrode lead.

DETAILED DESCRIPTION

Figure 2:
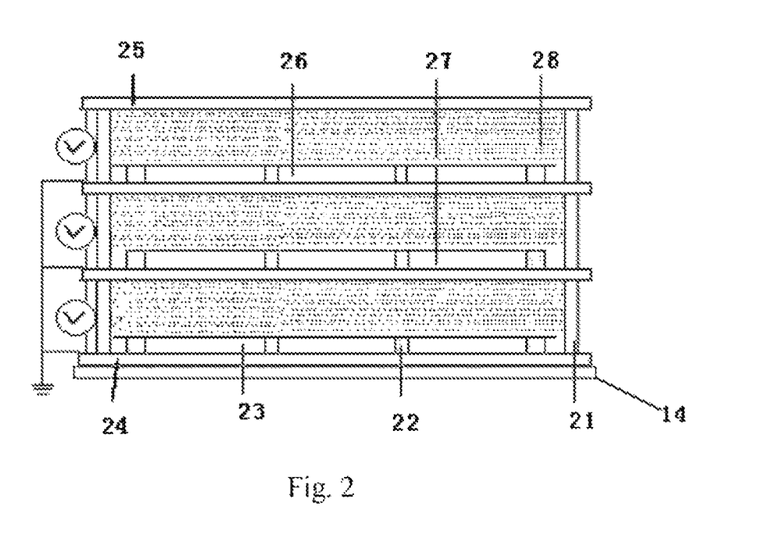
FIG. 2 is a structural diagram of a piece of three-layer full-color dynamic electronic paper according to the present disclosure.

Referring to FIG. 2, a piece of three-layer full-color dynamic electronic paper is provided, including a substrate 14, a controller, and a first EWOD display layer, a second EWOD display layer and a third EWOD display layer which are vertically distributed from top to bottom. Each of the first EWOD display layer, the second EWOD display layer and the third EWOD display layer is comprised of an upper transparent electrode plate 25, a hydrophobic insulating layer 23, 26 or 27, pixel walls 22, colored ink, colorless liquid 28, a lower transparent electrode plate 24, an encapsulation adhesive 21 and a driving chip. The driving chip is connected to the upper transparent electrode plate 25 and the lower transparent electrode plate 24, respectively. The lower transparent electrode plate 24 of the third EWOD display layer is located above the substrate 14. The colored ink filled in the first EWOD display layer, the second EWOD display layer and the third EWOD display layer, and provided on the hydrophobic insulating layers 23, 26 and 27, is cyan ink, magenta ink and yellow ink, respectively. The controller controls voltage waveforms of the three driving chips according to a subtractive color mixture principle of three primary colors for printing, so as to realize the overlay of different colors in a vertical structure and the full-color displaying of the electronic paper.

Further, as a preferred implementation, when the voltage applied between the upper transparent electrode plate 25 and the lower transparent electrode plate 24 by the driving chip is greater than or equal to a set voltage threshold, the colored ink will shrink to one side of the hydrophobic insulating layer 23, 26 or 27, so that light can penetrate through the hydrophobic insulating layer 23, 26 or 27; and conversely, when the voltage applied between the upper transparent electrode plate 25 and the lower transparent electrode plate 24 by the driving chip is less than the set voltage threshold, the colored ink is spread flat on the hydrophobic insulating layer 23, 26 or 27, so that light cannot penetrate through the hydrophobic insulating layer 23, 26 or 27.

Further, as a preferred implementation, the controller is an STM 32 microcontroller, and the three driving chips are SSD1623 bistable display drivers.

Figure 3:
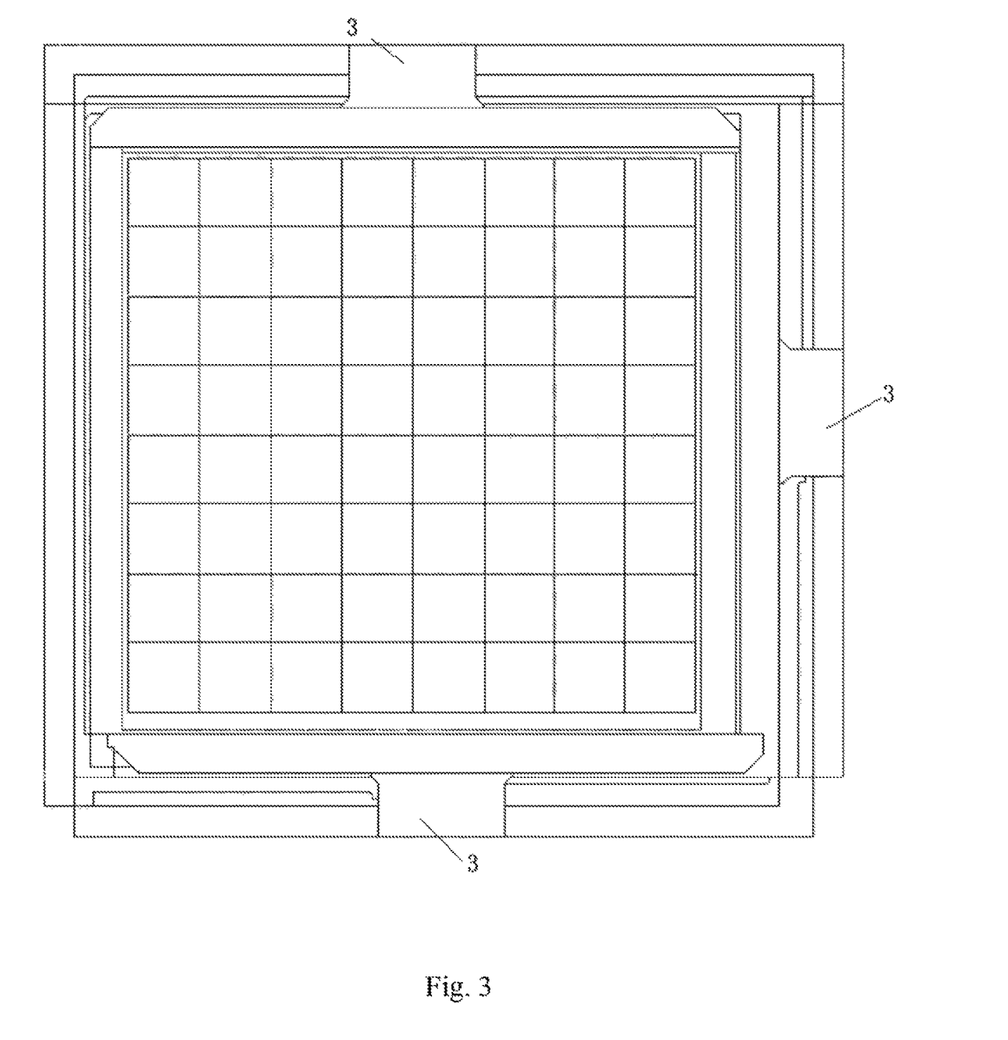
FIG. 3 is a structural diagram of a three-layer matrix EWOD display screen.

Referring to FIG. 3, further, as a preferred implementation, each of the first EWOD display layer, the second EWOD display layer and the third EWOD display layer is comprised of 64 pixel segments, and each of the pixel segments is comprised of a plurality of pixels separated by the pixel walls 22, wherein lower electrodes of all pixels in the same pixel segment are connected to form a pixel segment electrode, and the 64 pixel segment electrodes constitute lower transparent electrodes 24; upper electrodes of all pixels in the same pixel segment are connected to form a common electrode, and the common electrodes of the 64 pixel segments are connected to form a master common electrode as the upper transparent electrode plate 25; and, the 64 pixel segment electrodes and the one master common electrode are connected to 65 pins of the driving chip, respectively.

Further, as a preferred implementation, the substrate 14 is a substrate in white 14.

Figure 4:
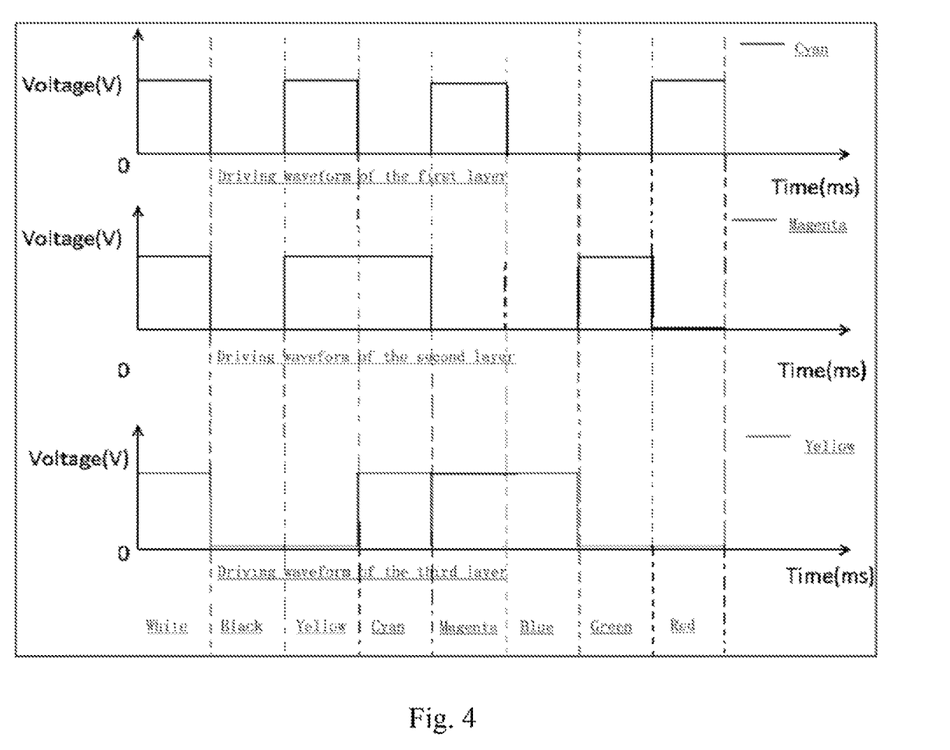
FIG. 4 is a diagram showing driving waveforms of lower transparent electrodes of three EWOD display layers according to the present disclosure.

Referring to FIG. 4, further, as a preferred implementation, under the premise that a low-voltage voltage is applied to the three upper transparent electrode plates 25, if a high-voltage waveform is applied to the pixel segment electrodes of all the first EWOD display layer, the second EWOD display layer and the third EWOD display layer, the color displayed by the electronic paper is the white color of the substrate 14; if a low-voltage waveform is applied to the pixel segment electrodes of all the first EWOD display layer, the second EWOD display layer and the third EWOD display layer, the color displayed by the electronic paper is black color; if a high-voltage waveform is applied to the pixel segment electrodes of the first EWOD display layer and the second EWOD display layer while a low-voltage waveform is applied to the pixel segment electrodes of the third EWOD display layer, the color displayed by the electronic paper is yellow color; if a high-voltage waveform is applied to the pixel segment electrodes of the second EWOD display layer and the third EWOD display layer while a low-voltage waveform is applied to the pixel segment electrodes of the first EWOD display layer, the color displayed by the electronic paper is cyan color; if a high-voltage waveform is applied to the pixel segment electrodes of the first EWOD display layer and the third EWOD display layer while a low-voltage waveform is applied to the pixel segment electrodes of the second EWOD display layer, the color displayed by the electronic paper is magenta color; if a low-voltage waveform is applied to the pixel segment electrodes of the first EWOD display layer and the second EWOD display layer while a high-voltage waveform is applied to the pixel segment electrodes of the third EWOD display layer, the color displayed by the electronic paper is blue color; if a low-voltage waveform is applied to the pixel segment electrodes of the first EWOD display layer and the third EWOD display layer while a high-voltage waveform is applied to the pixel segment electrodes of the second EWOD display layer, the color displayed by the electronic paper is green color; and, if a low-voltage waveform is applied to the pixel segment electrodes of the second EWOD display layer and the third EWOD display layer while a high-voltage waveform is applied to the pixel segment electrodes of the first EWOD display layer, the color displayed by the electronic paper is red color.

Figure 6:
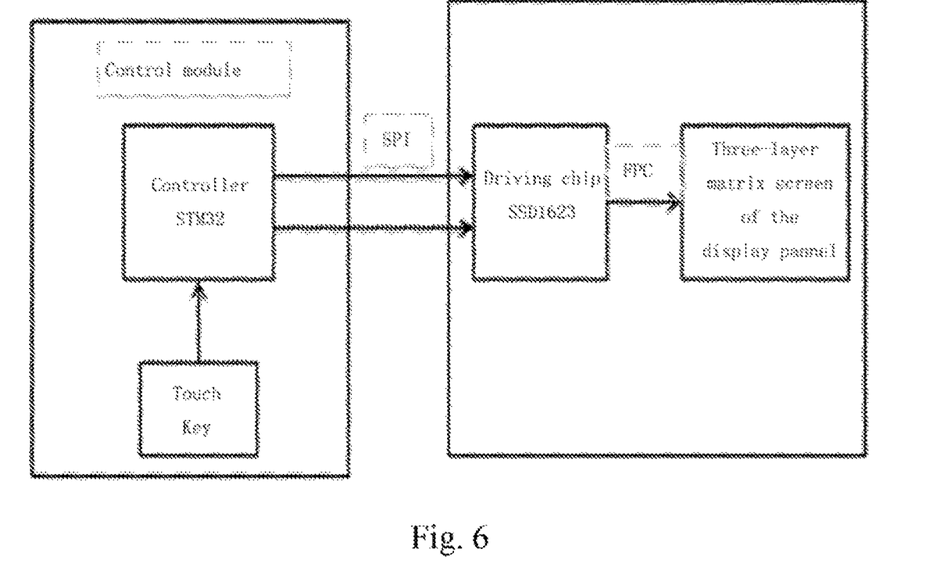
FIG. 6 is a structural block diagram of a control system corresponding to the electronic paper of the present disclosure.

Referring to FIG. 6, further, as a preferred implementation, the controller is connected to the driving chips via SPI buses, and the driving chips are connected to the upper transparent electrode plates 25 and the lower transparent electrode plates 24 via FPC flat cables, respectively.

Referring to FIG. 6, further, as a preferred implementation, the three-layer full-color dynamic electronic paper further includes a touch key, an output terminal of which is connected to an input terminal of the controller.

Further, as a preferred implementation, indium tin oxide conductive layers are coated on both the upper transparent electrode plates 25 and the lower transparent electrode plates 24.

Further, as a preferred implementation, the colorless liquid 28 is water.

The present disclosure will be further described below in detail by specific embodiments with reference to the accompanying drawings.

Embodiment 1

Based on the conventional single-layer and single-color EWOD display device structure, the present disclosure provides an EWOD display device of a three-layer structure, i.e., a three-layer full-color dynamic electronic paper. In this electronic paper, cyan ink, magenta ink and yellow ink (i.e., three primary colors for printing) is filled respectively in three hydrophobic insulating layer structures, and the on/off (i.e., by the driving waveform of the driving chip) of pixels in each layer is controlled by the controller according to the subtractive color mixture principle of three primary colors for printing, so as to realize the overlay of different colors in the vertical structure and thus realize full-color displaying.

Figure 5:
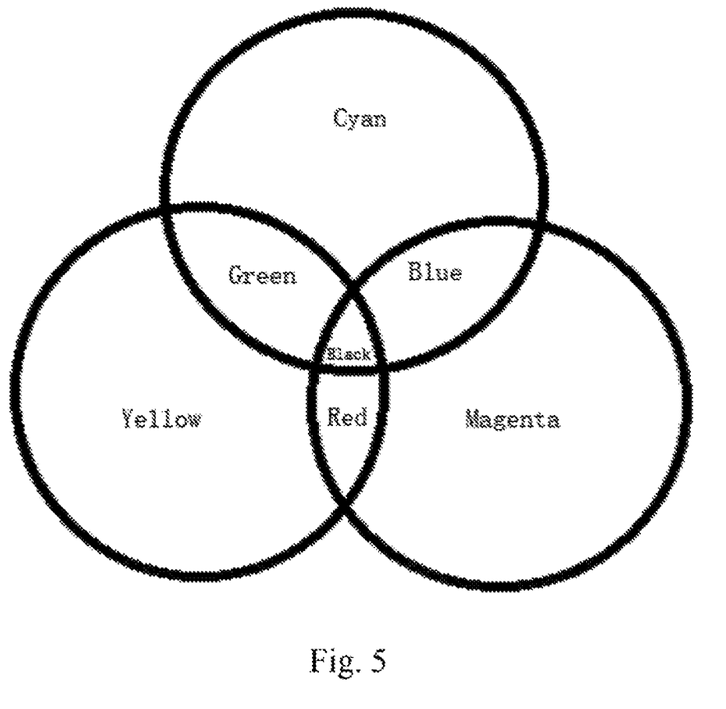
FIG. 5 is a diagram showing a subtractive color mixture principle of three primary colors for printing according to the present disclosure.

FIG. 2 shows the vertical structure of the EWOD display device of a three-layer structure. In this structure, three different colors (cyan, magenta and yellow) of ink are filled in the layers from top to down. The pixels of each EWOD display layer are separated apart by pixel walls, and upper and lower transparent electrode plates of ITO are coated on each layer. When a voltage difference applied to a certain EWOD display layer reaches a set voltage threshold (e.g., 30 V), the ink in this layer will be shrunk to a corner (i.e., one side of the hydrophobic insulating layer) according to the EWOD principle. If such voltages are applied on all of the three layers, the ink in each layer will be shrunk to a corner, light will penetrate through the hydrophobic insulating layer and is then reflected by the substrate 14, so that the electronic paper displays white color. If no voltage is applied to the three EWOD display layers (that is, the voltage difference is 0), the ink in each layer is not shrunk. In this case, it can be known from the subtractive color mixture principle of three primary colors for printing in FIG. 5, light of different wavelengths in natural spectrum will all be absorbed by the overlay of the three colored ink, and the color displayed is left black.

As shown in FIG. 3, the electronic paper of the present disclosure can employ a three-layer matrix EWOD display screen. Each layer of the display screen includes 64 pixel segments, and the structure of each pixel segment is comprised of a plurality of pixels. Lower electrodes of pixels in the same pixel segment are connected to form a pixel segment electrode, and upper electrodes are connected to form a common electrode; and, common electrodes of the 64 pixel segments are also connected together. Therefore, there are 64 pixel segment electrodes and one master common electrode on a display panel in each layer of the display screen. The 64 pixel segment electrodes correspond to 1 to 64 electrode leads 3.

The structural diagram of a control system corresponding to the electronic paper of the present disclosure is shown in FIG. 6. The STM32 controller programs driving waveforms of the driving chips and transmits data to the three display driving chips SSD1623 via SPI buses. 64 electrodes in each EWOD display layer are connected to 64 segment pins of the driving chip, respectively, and the upper transparent electrode plate is separately connected to a segment pin of the driving chip.

The driving voltage of each driving chip for the electrodes can be controlled by programming STM32, wherein the code "1" indicates that the output voltage of the responded segment pin is a high voltage and the code "0" indicates that the output voltage of the responded segment pin is a low voltage. The electronic paper of the present disclosure employs a direct driving method, i.e., applying a voltage. If it is assumed that the segment pin connected to the upper electrode plate in each layer outputs a high voltage "1", when the same high voltage "1" is applied to a pixel segment electrode, the colored ink of this pixel segment is not dispelled (that is, the colored ink is spread flat on the hydrophobic insulating layer; or otherwise, when a low voltage "0" is applied to the segment pixel, the colored ink of this pixel segment is dispelled (that is, the colored ink will shrink to one side of the hydrophobic insulating layer). FIG. 4 shows a corresponding driving waveform of each layer corresponding to each color displayed by the electronic paper of a three-layer EWOD structure according to the present disclosure. As shown in FIG. 4, under the premise that a low-voltage waveform is applied to the three upper transparent electrode plates, if it is expected to allow the electronic paper to display white color, it is required to simultaneously apply a high-voltage waveform to the pixel segment electrodes in each layer so that the colored ink in each layer is dispelled; if it is expected to allow the electronic paper to display black color, according to the subtractive color mixture principle diagram in FIG. 5, it is required to simultaneously apply a low-voltage waveform to the pixel segment electrodes in each layer, so that the cyan ink in the first layer is not dispelled, the magenta ink in the second layer is not dispelled and the yellow ink in the third layer is not dispelled; and, if it is expected to allow the electronic paper to display green color, according to the subtractive color mixture principle diagram in FIG. 5, it is required to apply a low-voltage waveform to the pixel segment electrodes in the first layer, apply a high-voltage waveform to the pixel segment electrodes in the second layer and apply a low-voltage waveform to the pixel segment electrodes in the third layer, so that the cyan ink in the first layer is not dispelled, the magenta ink in the second layer is dispelled and the yellow ink in the third layer is not dispelled. Similarly, according to the subtractive color mixture principle diagram in FIG. 5, the output driving waveforms corresponding to other colors and the corresponding on/off state of the colored ink in each layer can be obtained (if it is required to dispel the colored ink in a layer, a high-voltage waveform is to be applied to pixel segment electrodes; and, if it is required to not dispel the colored ink in a layer, a low-voltage waveform is to be applied to the pixel segment electrodes).

The EWOD is also called electro-humidifying. The present disclosure is also applicable to full-color electronic paper based on the electro-humidifying principle.

Compared with the prior art, the electronic paper of the present disclosure is formed by vertically superposing three EWOD structures which are respectively filled with cyan ink, magenta ink and yellow ink. Therefore, based on the conventional single-layer EWOD display device, two additional EWOD display layers are superposed, and the driving waveform of the driving chip corresponding to each color is controlled by the controller according to the subtractive color mixture principle of three primary colors for printing, so that the full-color displaying is realized, it is more comprehensive, and the range of application is wider.

Although several embodiments of the present disclosure have been specifically described above, the present disclosure is not limited thereto. Those skilled in the art can make various equivalent deformations or replacements without departing from the principle of the present invention, and these equivalent deformations or replacements shall fall into the scope defined by the claims of the present application.

What is claimed is:

1. Three-layer full-color dynamic electronic paper, comprising:
    a substrate;
    a first, second and third EWOD display layer which are vertically distributed from top to bottom; each of the first, second and third EWOD display layer is comprised of:
    pixel walls;
    colored ink;
    colorless liquid;
    an upper transparent electrode plate;
    a hydrophobic insulating layer, wherein the colored ink filled in the hydrophobic insulating layers of the first, second and third EWOD display layer is cyan ink, magenta ink and yellow ink, respectively;
    a lower transparent electrode plate, wherein a lower transparent electrode plate of the third EWOD display layer is located above the substrate;
    an encapsulation adhesive;
    a driving chip connected to the upper transparent electrode plate and the lower transparent electrode plate; wherein when the voltage applied between the upper transparent electrode plate and the lower transparent electrode plate by the driving chip is greater than or equal to a set voltage threshold, the colored ink will shrink to one side of the hydrophobic insulating layer, so that light can penetrate through the hydrophobic insulating layer, and conversely, when the voltage applied between the upper transparent electrode plate and the lower transparent electrode plate by the driving chip is less than the set voltage threshold, the colored ink is spread flat on the hydrophobic insulating layer, so that light cannot penetrate through the hydrophobic insulating layer;
    and
    a controller controlling voltage waveforms of the three driving chips according to a subtractive color mixture principle of three primary colors for printing, so as to realize the overlay of different colors in a vertical structure and the full-color displaying of the electronic paper.

2. The three-layer full-color dynamic electronic paper according to claim 1, wherein the controller is an STM 32 microcontroller, and the three driving chips are SSD1623 bistable display drivers.

3. The three-layer full-color dynamic electronic paper according to claim 2, wherein the substrate is a substrate in white.

4. The three-layer full-color dynamic electronic paper according to claim 2, wherein the controller is connected to the driving chips via SPI buses, and the driving chips are connected to the upper transparent electrode plates and the lower transparent electrode plates via FPC flat cables, respectively.

5. The three-layer full-color dynamic electronic paper according to claim 2, wherein indium tin oxide conducting layers are coated on both the upper transparent electrode plates and lower transparent electrode plates.

6. The three-layer full-color dynamic electronic paper according to claim 3, wherein the controller is connected to the driving chips via SPI buses, and the driving chips are connected to the upper transparent electrode plates and the lower transparent electrode plates via FPC flat cables, respectively.

7. The three-layer full-color dynamic electronic paper according to claim 3, wherein indium tin oxide conducting layers are coated on both the upper transparent electrode plates and lower transparent electrode plates.

8. The three-layer full-color dynamic electronic paper according to claim 1, wherein each of the first, second and third EWOD display layer is comprised of 64 pixel segments, and each of the pixel segments is comprised of a plurality of pixels separated by the pixel walls, wherein:
   lower electrodes of all pixels in the same pixel segment are connected to form a pixel segment electrode, and 64 pixel segment electrodes constitute lower transparent electrodes;
   upper electrodes of all pixels in the same pixel segment are connected to form a common electrode, and the common electrodes of the 64 pixel segments are connected to form a master common electrode as the upper transparent electrode plate;
   the 64 pixel segment electrodes and the one master common electrode are connected to 65 pins of the driving chip, respectively.

9. The three-layer full-color dynamic electronic paper according to claim 8, wherein under the premise that a low-voltage voltage is applied to the three upper transparent electrode plates,
   if a high-voltage waveform is applied to the pixel segment electrodes of all the first, second and third EWOD display layer, the color displayed by the electronic paper is the white color of the substrate;
   if a low-voltage waveform is applied to the pixel segment electrodes of all the first, second and third EWOD display layer, the color displayed by the electronic paper is black color;
   if a high-voltage waveform is applied to the pixel segment electrodes of the first EWOD display layer and the second EWOD display layer while a low-voltage waveform is applied to the pixel segment electrodes of the third EWOD display layer, the color displayed by the electronic paper is yellow color;
   if a high-voltage waveform is applied to the pixel segment electrodes of the second EWOD display layer and the third EWOD display layer while a low-voltage waveform is applied to the pixel segment electrodes of the first EWOD display layer, the color displayed by the electronic paper is cyan color;
   if a high-voltage waveform is applied to the pixel segment electrodes of the first EWOD display layer and the third EWOD display layer while a low-voltage waveform is applied to the pixel segment electrodes of the second EWOD display layer, the color displayed by the electronic paper is magenta color;
   if a low-voltage waveform is applied to the pixel segment electrodes of the first EWOD display layer and the second EWOD display layer while a high-voltage waveform is applied to the pixel segment electrodes of the third EWOD display layer, the color displayed by the electronic paper is blue color;
   if a low-voltage waveform is applied to the pixel segment electrodes of the first EWOD display layer and the third EWOD display layer while a high-voltage waveform is applied to the pixel segment electrodes of the second EWOD display layer, the color displayed by the electronic paper is green color; and,
   if a low-voltage waveform is applied to the pixel segment electrodes of the second EWOD display layer and the third EWOD display layer while a high-voltage waveform is applied to the pixel segment electrodes of the first EWOD display layer, the color displayed by the electronic paper is red color.

10. The three-layer full-color dynamic electronic paper according to claim 8, wherein the controller is connected to the driving chips via SPI buses, and the driving chips are connected to the upper transparent electrode plates and the lower transparent electrode plates via FPC flat cables, respectively.

11. The three-layer full-color dynamic electronic paper according to claim 8, wherein indium tin oxide conducting layers are coated on both the upper transparent electrode plates and lower transparent electrode plates.

12. The three-layer full-color dynamic electronic paper according to claim 1, wherein the controller is connected to the driving chips via SPI buses, and the driving chips are connected to the upper transparent electrode plates and the lower transparent electrode plates via FPC flat cables, respectively.

13. The three-layer full-color dynamic electronic paper according to claim 1, wherein the controller is connected to the driving chips via SPI buses, and the driving chips are connected to the upper transparent electrode plates and the lower transparent electrode plates via FPC flat cables, respectively.

14. The three-layer full-color dynamic electronic paper according to claim 1, wherein the controller is connected to the driving chips via SPI buses, and the driving chips are connected to the upper transparent electrode plates and the lower transparent electrode plates via FPC flat cables, respectively.

15. The three-layer full-color dynamic electronic paper according to claim 1, further comprising a touch key, an output terminal of which is connected to an input terminal of the controller.

16. The three-layer full-color dynamic electronic paper according to claim 1, wherein indium tin oxide conducting layers are coated on both the upper transparent electrode plates and lower transparent electrode plates.

17. The three-layer full-color dynamic electronic paper according to claim 1, wherein indium tin oxide conducting layers are coated on both the upper transparent electrode plates and lower transparent electrode plates.

18. The three-layer full-color dynamic electronic paper according to claim 1, wherein indium tin oxide conducting layers are coated on both the upper transparent electrode plates and lower transparent electrode plates.

19. The three-layer full-color dynamic electronic paper according to claim 1, wherein the colorless liquid is water.

* * * * *